(12) United States Patent
Porter (10) Patent No.: US 6,964,446 B2
(45) Date of Patent: Nov. 15, 2005

(54) RETRACTABLE CAR COVER (76) Inventor: Matthew B. Porter, 3929 N. 123rd Ter., Kansas City, KS (US) 66109

( * ) Notice: Subject to any disclaimer, the term of this patent is extended or adjusted under 35 U.S.C. 154(b) by 31 days.

(21) Appl. No.: 10/811,269

(22) Filed: Mar. 26, 2004

(65) Prior Publication Data
US 2005/0212322 A1 Sep. 29, 2005

(51) Int. Cl.$^7$ .............................................. B60J 11/00
(52) U.S. Cl. ..................... 296/98; 296/136.11; 160/24; 160/370.22; 150/166
(58) Field of Search ............................ 296/98, 136.01, 296/136.02, 136.03, 136.04, 136.1, 136.11, 296/136.12; 150/166; 160/24, 370.22, 133, 160/238–326

(56) References Cited

U.S. PATENT DOCUMENTS

| | | | | |
|---|---|---|---|---|
| 4,795,207 A | * | 1/1989 | Clarke | 150/166 |
| 4,848,823 A | | 7/1989 | Flohr et al. | 296/98 |
| 4,856,842 A | | 8/1989 | Ross et al. | 296/136.03 |
| 4,958,881 A | * | 9/1990 | Piros | 296/98 |
| 5,022,700 A | * | 6/1991 | Fasiska et al. | 296/98 |
| 5,029,933 A | * | 7/1991 | Gillem | 296/136.11 |
| 5,176,421 A | | 1/1993 | Fasiska | 296/136.03 |
| 5,242,206 A | * | 9/1993 | Heck | 296/136.02 |
| 5,368,912 A | * | 11/1994 | Reaves | 428/192 |
| 5,423,588 A | * | 6/1995 | Eglinton | 296/98 |
| 5,476,127 A | * | 12/1995 | Fournier | 150/166 |
| 5,597,196 A | | 1/1997 | Gibbs | 296/98 |
| 5,902,003 A | | 5/1999 | Hindson | 296/136.02 |
| 6,092,857 A | | 7/2000 | Rivas | 296/136.04 |
| 6,131,643 A | | 10/2000 | Cheng et al. | 160/370.22 |
| 6,502,889 B2 | | 1/2003 | Fukagawa | 296/98 |
| 6,591,858 B2 | | 7/2003 | Peterson | 137/355.23 |

* cited by examiner

Primary Examiner—Jason Morrow
(74) Attorney, Agent, or Firm—Dale J. Ream (57) ABSTRACT A retractable vehicle cover apparatus for covering a vehicle comprises an elongated, hollow housing, and axle disposed therein for rotation about a central axis, and an elongated cover having a proximal end coupled with the axle and also having a distal end. The housing includes wall structure having an elongated aperture defined through the wall structure. The cover is fed through the aperture for selective movement between a retracted position where the cover is wrapped around the axle, and an extended position where a substantial portion of the cover extends from the housing. The cover includes an outer layer of aligned cover strips, a middle, elastic layer and an inner layer of aligned padding strips. The elastic layer biases the cover toward a rest width substantially the same length as the aperture to facilitate extension and retraction of the cover, and permits selective expansion of the cover in order to more fully cover the vehicle.

16 Claims, 7 Drawing Sheets

RETRACTABLE CAR COVER

BACKGROUND OF THE INVENTION

1. Field of the Invention

The present invention relates generally to a car cover stored in a canister that is deployed to cover a car, protecting the car from natural elements. More particularly, the present invention includes a novel cover that assists in facilitating deployment and storage of the cover.

2. Discussion of the Prior Art

Retractable car covers are known in the prior art. For example, U.S. Pat. No. 4,856,842 to Ross et al., discloses a retractable car cover that is stored in a canister for selective deployment. The cover disclosed in the Ross reference is constructed from fabric commonly used in the art of car covers and is necessarily significantly wider than the canister. As a result, as the cover is retracted into the canister, the canister must mechanically gather the sides of the cover. This may result in unwanted bunching of the cover that will in turn result in the cover becoming jammed within the canister.

Other references, such as U.S. Pat. No. 6,131,643 to Cheng et al., disclose alternative retractable car covers. The cover of the Cheng reference includes side panels that are folded over a middle panel for preparing the cover for storage. The folded cover is then reeled in and stored about a drum located in the trunk of the car. During retraction, the user must insure that the side panels remain flat against the middle panel to prevent unwanted bunching of the cover. As the cover in the Cheng reference is configured to be stored in the trunk of a car, deployment and retraction of the cover requires the trunk of the car to be opened. In addition, the cover only covers the cabin and forward hood areas of the car, leaving the trunk area unprotected.

There is a need in the art of retractable car covers to provide a cover incorporates many of the benefits of the prior art car covers while addresses the concerns noted above. The present invention addresses these concerns.

BRIEF SUMMARY OF THE INVENTION

A retractable vehicle cover apparatus for selectively covering a vehicle broadly comprises an elongated, hollow housing, and axle disposed within the housing for rotational movement about a central axis, and an elongated, expandable cover having a first, distal end and a second, proximal end coupled with the axle. The housing includes side wall structure having an elongated aperture presenting a length defined through the wall structure. The proximal end of the cover is fed through the aperture so that the cover may be selectively moved between a retracted position where the cover is wrapped around the axle, and an extended position where a substantial portion of the cover extends from the housing.

The cover includes several layers to yield a cover configured to protect the vehicle from the elements, inhibit scratching or other signs of wear on the vehicle during usage, and permit selective expansion of the cover in order to more fully cover the vehicle. More particularly, the preferred cover includes an outer, generally opaque, water resilient layer, a middle, elastic layer and an inner layer of protective padding. The elastic layer biases the cover toward a rest width substantially the same as the length of the aperture to facilitate extension and retraction of the cover to and from the housing, while permitting selective expansion of the cover. A pair of straps are attached to the side edges of the cover and may be selectively coupled to the lower portion of the sides of the vehicle in order to maintain the cover in the expanded condition.

The housing includes coupling structure for removably coupling the housing to a vehicle. The coupling structure includes a pair of support arms attached to the housing side wall structure and a support bracket configured to be mounted directly on the frame of the vehicle.

A cover extension and retraction system is located in the housing. The system includes a ratchet wheel mounted on the axle and a pawl engaging the wheel permitting rotation of the wheel, and thus the axle in a first, counter-clockwise direction for extension of the cover. A release button is used to selectively disengage the pawl from the ratchet wheel to permit rotation of the wheel in a second, clockwise direction to permit retraction of the cover into the housing. A crank handle is coupled with the axle for facilitating rotation of the axle.

BRIEF DESCRIPTION OF THE SEVERAL VIEWS OF THE DRAWINGS

A preferred embodiment of a retractable car cover is described in detail below with reference to the drawing figures, wherein.

DETAILED DESCRIPTION OF THE PREFERRED EMBODIMENT

Figures 1A, 1B, 1C:
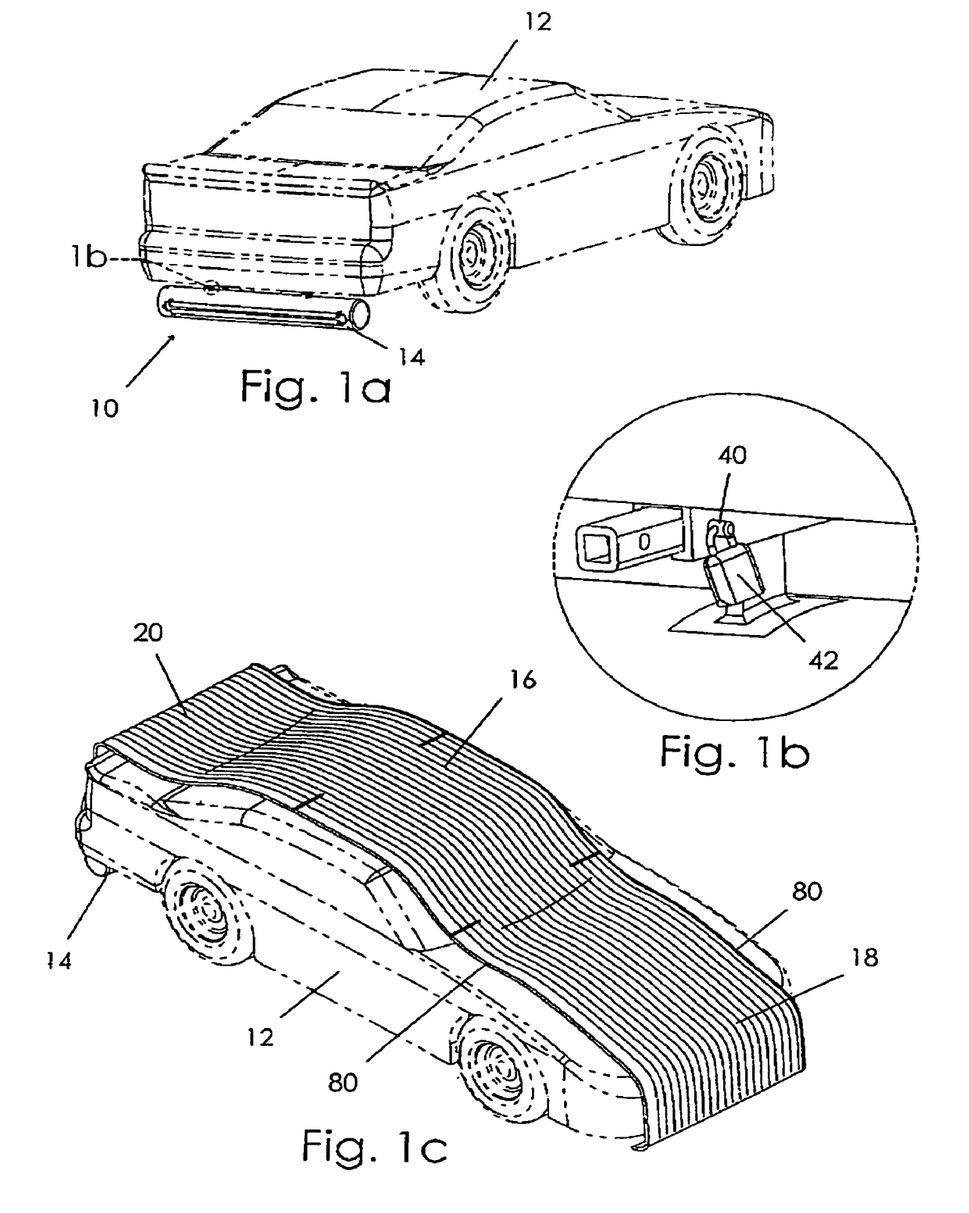
FIG. 1a is a perspective view of a car with a retractable car cover apparatus constructed in accordance with a preferred embodiment of the present invention coupled to the rear of the car.
FIG. 1b is a perspective view showing more detail of the attachment structure of the preferred apparatus.
FIG. 1c is a perspective view of the car cover extended over the length of the car.
Figure 2A:
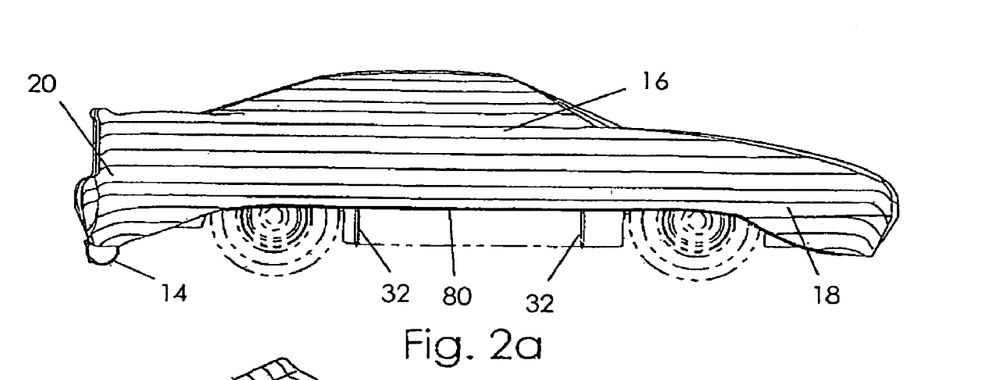
FIG. 2a is a side elevation of the car cover in a deployed configuration.
Figure 2B:
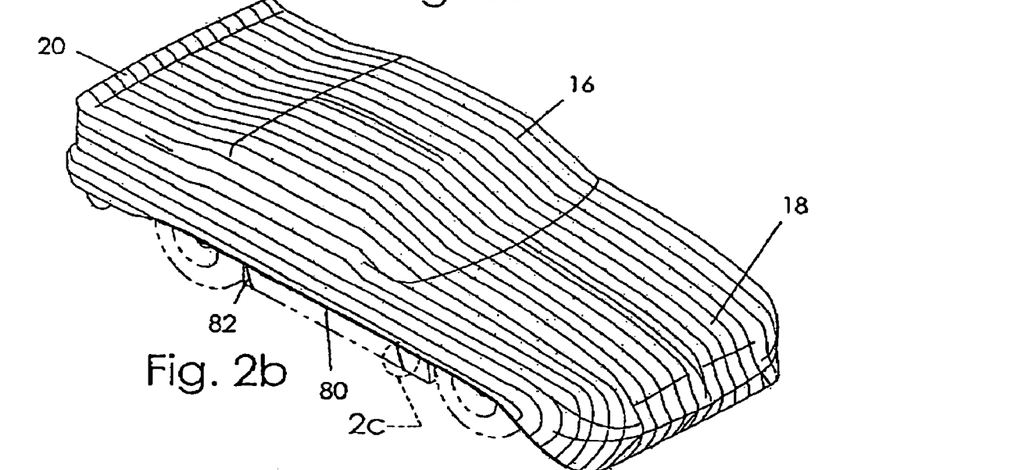
FIG. 2b is a perspective view of the car cover in the deployed configuration.

Referring now to the drawings, FIG. 1a depicts a retractable vehicle cover apparatus 10 constructed in accordance with a preferred embodiment of the present invention coupled to the frame of a car 12. The cover apparatus 10 broadly comprises an elongated, generally cylindrical housing 14 having side wall structure defining an interior cavity, and a cover 16 received in the cavity of the housing 14 for selective retraction and extension to and from the housing 14. The cover 16 includes a distal first end 18 and a proximal second end 20. The cover 16 is expandable to more fully cover the car 12, as shown in FIGS. 2*a*, 2*b*.

Figure 4:
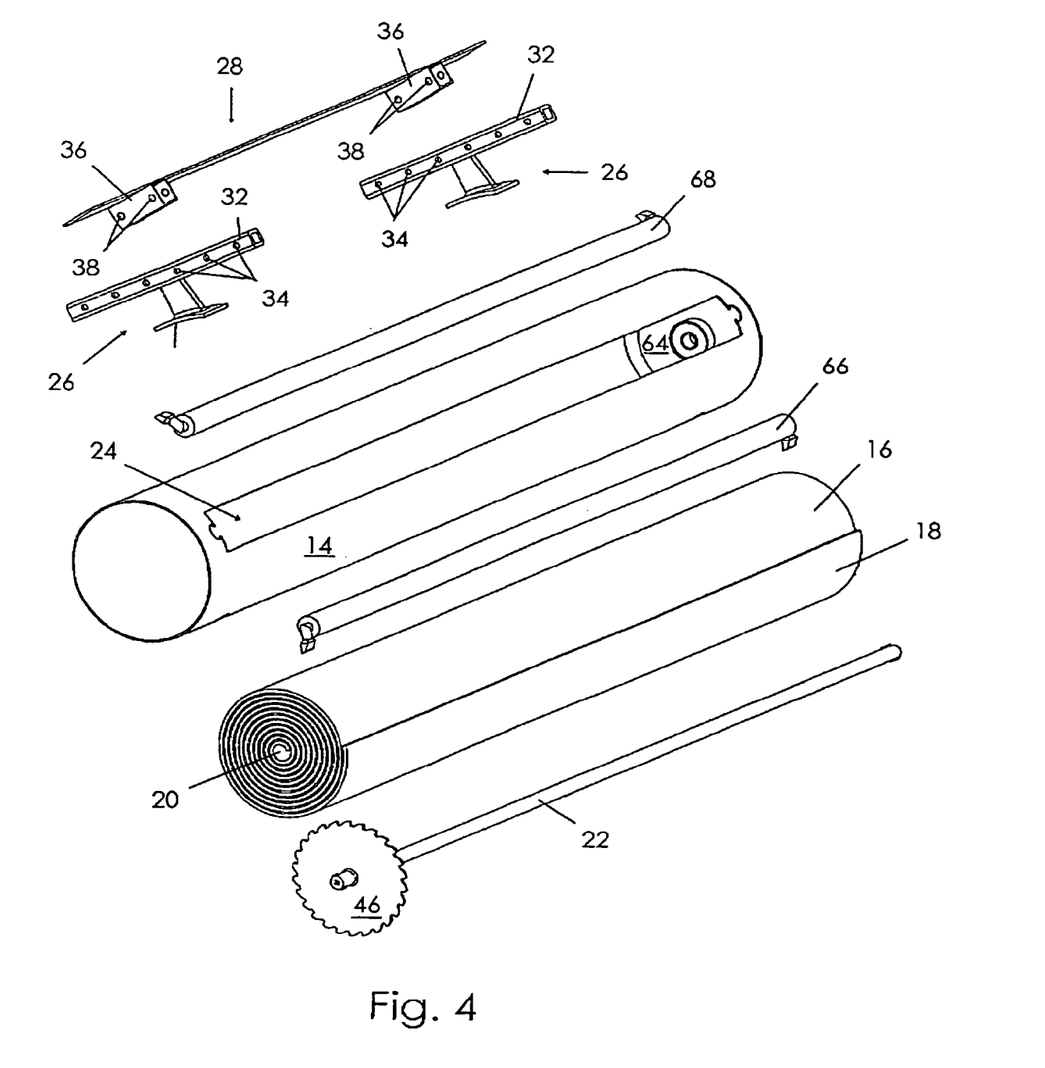
FIG. 4 is an exploded view of various components of the apparatus.

FIG. 4 depicts additional detail concerning some of the elements of the apparatus 10. An axle 22 is disposed within the cavity of the housing 14 for rotational movement about a central axis. The proximal end 20 of the cover 16 is coupled with the axle 22. The housing 14 includes side wall structure having an elongated aperture 24 presenting a length defined through the wall structure. The proximal end 20 of the cover 16 is fed through the aperture 24 so that the cover 16 may be selectively moved between a retracted position (shown in FIG. 1*a*) where the cover 16 is substantially wrapped around the axle 22, and an extended position (shown in FIG. 1*c*) where a substantial portion of the cover 16 extends from the housing 14. A pair of drain holes 25 are also formed in the wall structure for facilitating drainage of unwanted water accumulated during inclement weather.

The housing 14 includes coupling structure for removably coupling the housing 14 to the frame of the car 12. As shown in FIG. 4, the coupling structure includes a pair of support arms 26 attached to the housing side wall structure and a support bracket 28 configured to be mounted directly on the frame of the car 12. The supports arms 26 each include a base 30 and a hanger 32. The hangers 32 have a plurality of positioning apertures 34 defined therethrough. The support bracket 28 includes a pair of depending sleeves 36 sized for telescopically receiving the hangers 28. The sleeves 36 have a plurality of sleeve apertures 38 defined through the sleeves 36.

The housing 14 is mounted on the car 12 by inserting the hangers 32 into the corresponding sleeve 36, and adjusting the hanger therein until the housing 14 is located in a desired position beneath the car 12 and one set of the positioning apertures 34 is aligned with one set of the sleeve apertures 38. A locking pin 40 (shown in FIG. 1*b*) is then inserted through each set of aligned positioning and sleeve apertures 34, 38. For security, a pad lock 42 is coupled with the pin 40, securely fixing the apparatus 10 to the car 12.

Figure 3A:
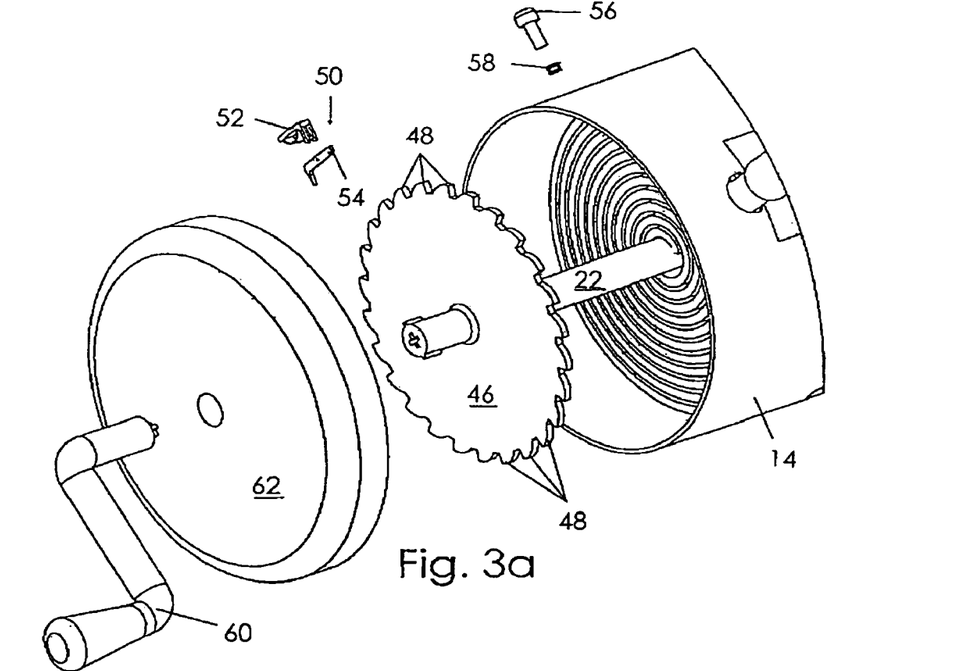
FIG. 3a is an exploded view of the ratchet and pawl retraction system for the cover.
Figure 3B:
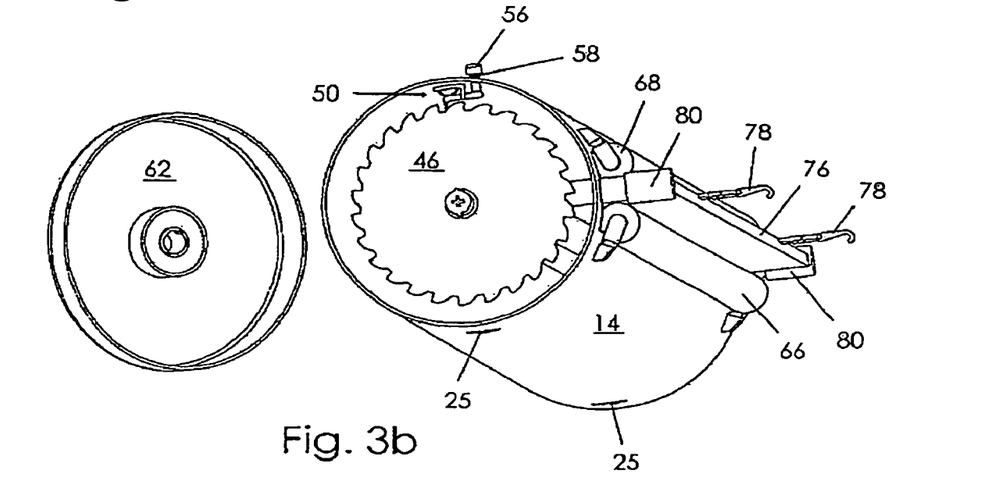
FIG. 3b is a perspective view of the housing with the cap removed showing the ratchet and pawl retraction system.

Turning now to FIGS. 3*a* and 3*b*, a cover extension and retraction system 44 is located in the housing 14 for selectively extending the cover 16 toward the extended position, and retracting the cover 16 toward the retracted position. The system 44 includes a ratchet wheel 46 having a plurality of radially disposed teeth 48 mounted on the axle 22 and a pawl 50. The pawl 50 includes a pawl bracket 52 and a pawl arm 54 pivotally mounted on the bracket 52. The pawl arm 54 is biased toward an engagement position engaging the teeth 48 of the wheel 46 permitting rotation of the wheel 46, and thus the axle 22 in a first, counter-clockwise direction for extension of the cover 16. A release button 56 is positioned for linear movement between an upper position and a lower, pawl releasing position. A spring 58 biases the button 56 toward the upper position.

A crank handle 60 is coupled with the axle 22 for effecting the desired rotation of the axle 22. To retract the cover 16, the release button 56 is depressed toward the release position, so that the pawl arm 54 pivots and disengages from the teeth 48 of the wheel 46. The crank handle 60 is then used to rotate the axle 22 in a clockwise direction, retracting the cover 16 into the housing 14. A pair of end caps 62, 64 are provided for containing the various interior elements of the housing 14.

The housing 14 further includes a pair of opposed rollers 66, 68 mounted on the exterior of the housing 14 and positioned adjacent to the aperture 24 (FIGS. 3*b* and 4). The rollers 66, 68 assist in evenly wrapping the cover 16 about the axle 22 and inhibiting unwanted bunching of the cover 16 during retraction, a condition that could lead to accidental jamming of the apparatus 10.

Figure 5A:
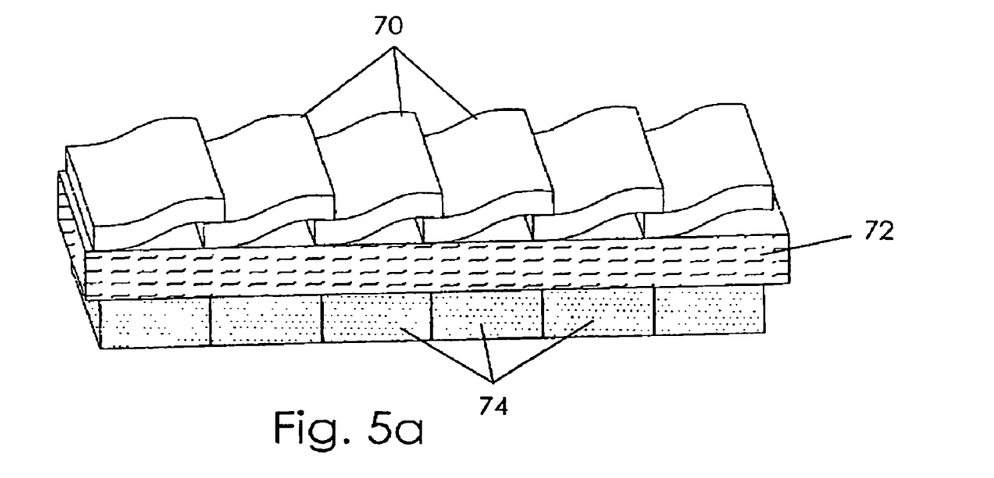
FIG. 5a is a cross-sectional view of the car cover of the present invention in a rest state.
Figure 5B:
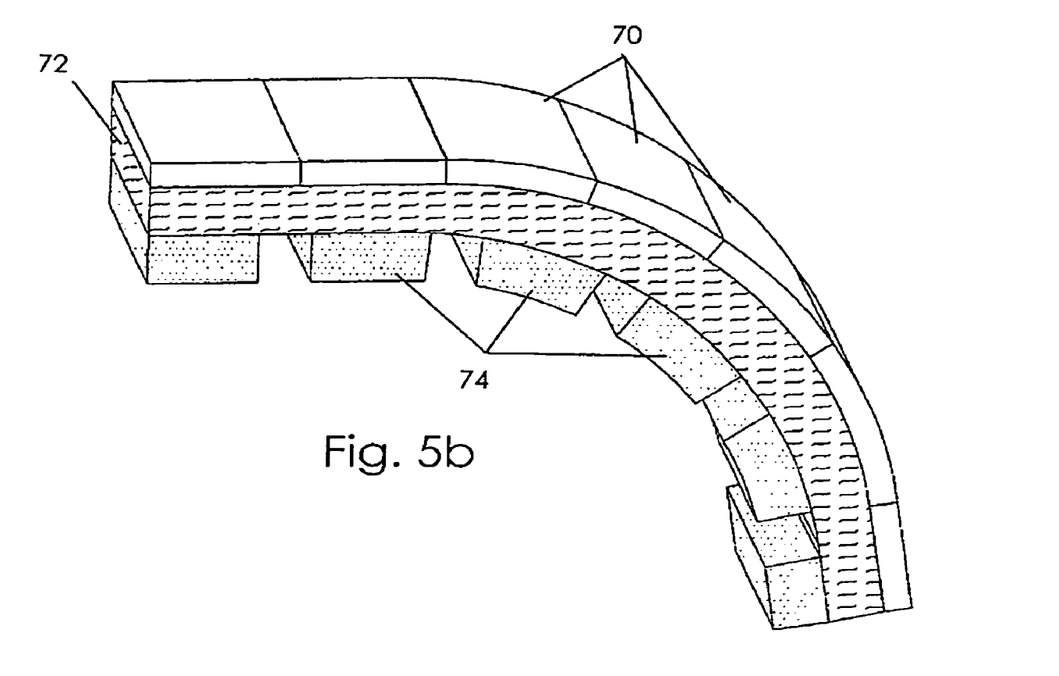
FIG. 5b is a cross-sectional view of the car cover of the present invention in an expanded state.

A cross-sectional view of the preferred cover 16 is shown in FIGS. 5*a*, 5*b*. The cover 16 includes several layers configured to protect the car 12 from the elements, inhibit scratching or other signs of wear on the car during usage of the apparatus 10, and permit selective expansion of the cover 16 in order to more fully cover the car 12.

More particularly, the cover 16 includes an outer, generally opaque, water resilient layer formed from a plurality of flexible, aligned cover strips 70, a middle, elastic layer 72 and an inner layer formed from a plurality of aligned padded strips 74. Preferably, the cover strips 70 are constructed from a generally flexible, opaque, synthetic resin material. The cover strips 70 are mated to the elastic layer 72. The elastic layer 72 biases the cover 16 toward a rest condition in which the width of the cover 16 is substantially the same as the length of the aperture 24 in the housing 14. As a result, the width of the cover 16 facilitates extension and retraction of the cover 16 to and from the housing 14.

When the cover 16 is in the rest condition, the cover strips 70 overlap one another, as shown in FIG. 5*a*, permitting the cover 16 to narrow. In this condition, the padding strips 74 abut each other. When the cover 16 is expanded toward the expanded condition for covering the car 12, the cover strips 70 move into a position tending to abut each other, as shown in FIG. 5*b*. This yields a generally water resilient, opaque outer layer. The padding strips 74 are spaced apart when the cover 16 is in the expanded condition and function as a protective layer between the surface of the car 12 and the middle and outer layers of the cover 16.

Cover attachment structure is coupled with the distal end 18 of the cover 16. The attachment structure includes an end rail 76 and a pair of hooks 78 (FIG. 3*b*). The end rail 76 functions to prevent the distal end 18 of the cover 16 from being entirely withdrawn into the housing 14 and to provide a gripping surface for a user of the apparatus 10 to pull the distal end 18 and extend the cover 16 toward the extended position. Alternatively, a bolt rope (not shown) may be coupled to the distal end 18 of the cover 16. A bolt rope would be less likely to scratch or otherwise damage the car 12 during usage of the apparatus 10.

When the cover 16 is extended over the car 12, the hooks 78 are positioned to secure the distal end 18 of the cover 16 to the car 12. The handle 60 is then rotated clockwise to provide slight tension on the cover 16, further securing the hook 78 and thus the cover 16 to the car 12.

Figure 2C:
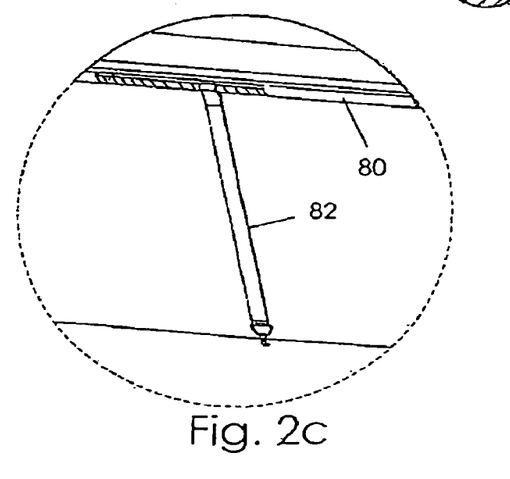
FIG. 2c is a perspective view showing more detail of the straps used for maintaining the cover in the deployed configuration.

A flexible rail, cable or bolt rope is provided along the opposed side edges 80 of the cover 16. A pair of straps 82 are attached to each of the side edges 80 of the cover 16 and are selectively coupled to the lower rocker panel of the car 12 in order to maintain the cover 16 in the expanded condition (FIG. 2*c*). The rails act to spread the tensile force of the straps 82 along the edges 80 of the cover.

In use, the support bracket 28 is secured to the frame of the car 12. The housing 14 is then positioned at the rear of the car 12 by inserting the hangers 32 into the corresponding sleeves 38. After the corresponding positioning apertures 34 are aligned with the desired sleeve apertures 38, the locking pins 40 are inserted through the aligned apertures 34, 38. At least one of the locking pins 40 is secured in place by the pad lock 42. The car 12 may be operated in an unimpeded manner with the apparatus 10 in position for usage.

The distal end 18 of the cover 16 is then pulled from the housing 14, over the top of the car 12 until the hooks 78 are coupled with the front of the car 12. The release button 56 is depressed and the handle 60 is rotated clockwise until sufficient tension is placed on the cover 16 to secure the hooks 78 to the front of the car 12. Releasing the button 56 re-engages the pawl 50 with the ratchet wheel 46, locking the cover 16 in place.

The straps 82 are then pulled and attached to the lower rocker panels along the sides of the car 12. When the straps 82 are in position, the cover 16 will have been stretched into the expanded condition, covering a substantial portion of the car 12.

The car 12 is uncovered by detaching the straps 82 from the rocker panels, permitting the elastic layer 72 to return the cover 16 to its rest width. In the rest width, the cover 16 may be retracted into the housing 14 through the housing aperture 24. This is accomplished by depressing the release button 56 disengaging the pawl 50 from the ratchet wheel 46 and rotating the handle 60 clockwise, retracting the cover 16 until a desired amount of the cover 16 is withdrawn into the housing 14. The apparatus 10 may be left in place for future use, or removed and placed into storage.

Figure 6A:
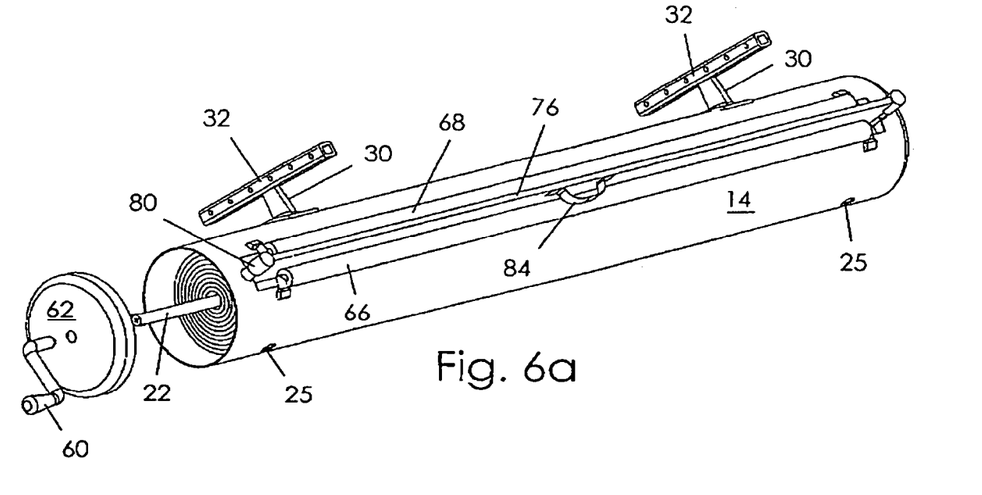
FIG. 6a is a partially exploded view of a retractable car cover the apparatus constructed in accordance with a preferred embodiment of the present invention.
Figure 6B:
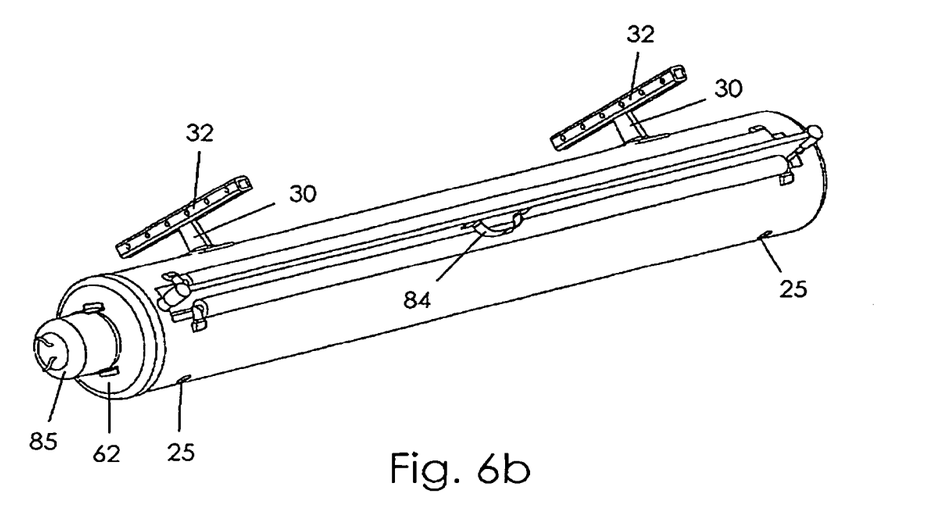
FIG. 6b is a perspective view of a retractable car cover apparatus constructed in accordance with an alternative embodiment of the present invention.

As shown in FIGS. 6a and 6b, a handle 84 may also be mounted on the end rail 76. The handle 84 facilitates gripping of the proximal end 18 of the cover 16 for extension of the cover 16 toward the extended position.

During retraction of the cover 16, the straps 82 are positioned to rest on the upper, protective layer, so that as the cover 16 is retracted, the straps 82 are rolled up in the cover 16. Alternatively, hook and loop material may be used to secure the straps 82 to the cover 16 for retraction of the cover 16.

An alternative extension and retraction system is shown in FIG. 6b. The alternative system utilizes an electrically driven motor 85 for retraction of the cover 16. The motor 85 is electrically coupled with an electrical source (not shown).

Figure 7A:
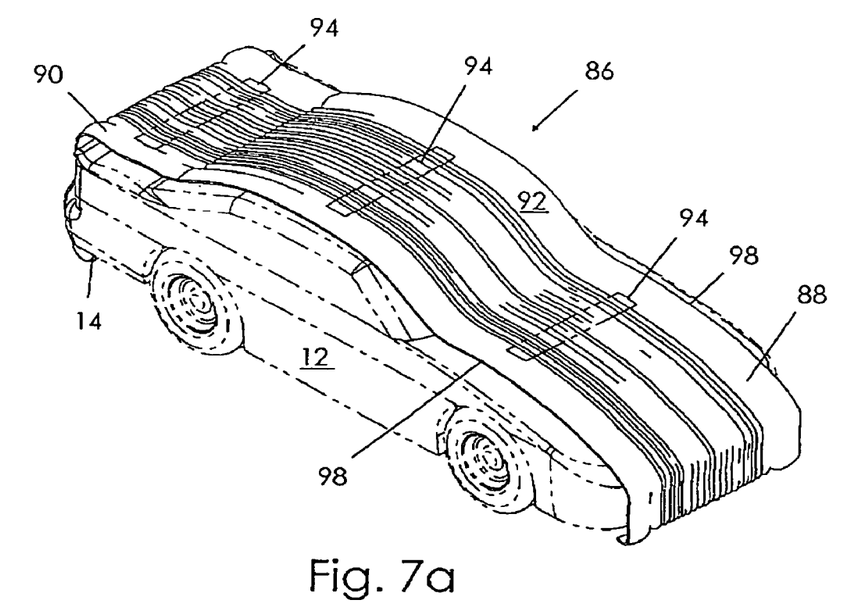
FIG. 7a is a perspective view of an alternative car cover extended over a car.
Figure 7B:
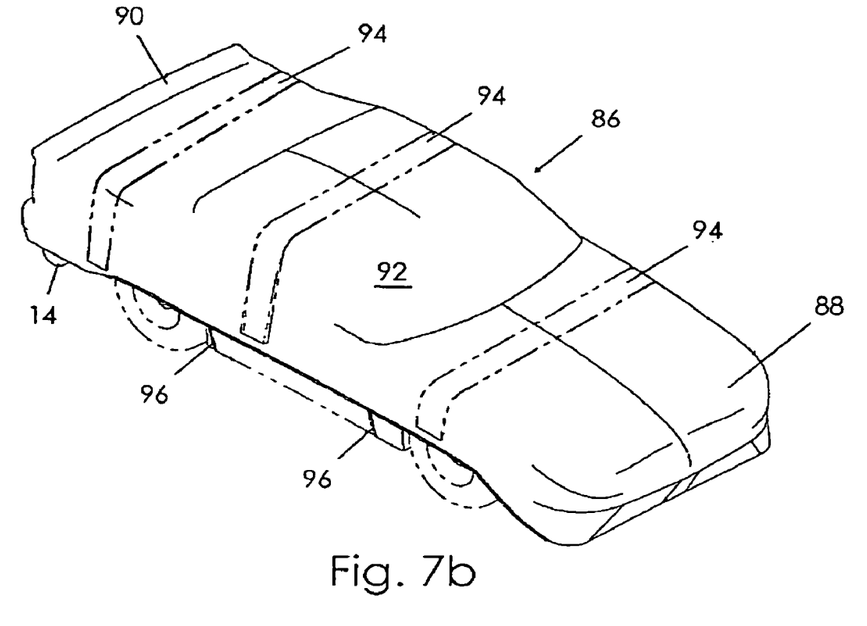
FIG. 7b is a perspective view of the car cover of FIG. 7a in an expanded configuration, covering the car.

An elongated, alternative cover 86 is depicted in FIGS. 7a and 7b. The alternative cover 86 includes a distal end 88 and a proximal end 90 coupled with the axle 22. The cover 86 further includes an outer protective layer 92 and several elastic bands 94 underneath the protective layer 92. The bands 94 bias the cover 86 toward a rest width substantially the same as the length of the aperture 24, permitting extension and retraction of the cover from and to the housing 14. The bands 94 permit the cover 86 toward an expanded condition wherein the cover 86 is capable of covering a large portion of the car 12. A pair of straps 96 are coupled to the side edges 98 of the cover 86 for holding the cover 86 in the expanded condition while covering the car 12. The alternative cover 86 is extended and retracted in much the same manner as the preferred cover 16.

The invention has been described in the above preferred embodiments with reference to the drawing figures. It is understood that substitutions may be made and equivalents employed herein without departing from the scope of the invention as set forth in the following claims.

What is claimed is:

1. A retractable vehicle cover apparatus for selectively covering a vehicle having sides, the apparatus comprising:
   an elongated housing presenting side wall structure and having an elongated aperture presenting a length defined through the wall structure;
   an axle disposed within the housing for rotational movement about a central axis; and
   an elongated cover having a first end and a second end coupled with the axle, the cover being selectively movable between an extended position where a substantial portion of the cover extends from the housing and a retracted position where the cover is substantially wrapped around the axle;
   wherein the cover includes opposed edges defining a width, the cover including adjustment means for permitting selective adjustment of the width of the cover between a rest condition where the width of the cover is substantially the same as the length of the aperture and an expanded condition where the cover is expanded to cover a portion of the sides of the vehicle; and
   wherein the adjustment means includes an elastic backing member having a rest width substantially the same as the length of the aperture.

2. The retractable cover apparatus as set forth in claim 1, wherein the cover further includes a plurality of elongated, aligned cover strips extending substantially from the first end to the second end of the cover, the cover strips being mated to the backing member.

3. The retractable cover apparatus as set forth in claim 2, wherein the cover strips are constructed from a flexible, generally water resilient material.

4. The retractable cover apparatus as set forth in claim 2, wherein the cover strips are constructed from generally flexible, synthetic resin material.

5. The retractable cover apparatus as set forth in claim 2, wherein the cover further includes a plurality of padding strips mated to the backing member.

6. The retractable cover apparatus as set forth in claim 2, wherein the cover further includes a pair of straps, each strap being coupled with one of the edges of the cover for retaining the cover in the expanded condition.

7. A retractable vehicle cover apparatus comprising:
   an elongated housing presenting side wall structure and having an elongated aperture presenting a length defined through the wall structure;
   an axle disposed within the housing for rotational movement about a central axis; and
   an elongated cover having a first end and a second end coupled with the axle, the cover being selectively movable between an extended position were a substantial portion of the cover extends from the housing and a retracted position where the cover is substantially wrapped around the axle;
   the cover including a plurality of elongated, aligned padding strips extending substantially from the first end to the second end, and an elastic backing member mated to the strips for permitting selective expansion of the cover toward an expanded condition for covering the vehicle when the cover is in the extended position.

8. The retractable cover apparatus as set forth in claim 7, wherein the elastic backing member presents a rest width substantially the same as the length of the aperture, and the backing member extends substantially from the first end to the second end of the cover.

9. The retractable cover apparatus as set forth in claim 7, wherein the cover further includes a plurality of elongated, aligned cover strips extending substantially from the first end to the second end of the cover, the cover strips being mated to the backing member.

10. The retractable cover apparatus as set forth in claim 9, wherein the cover strips are constructed from a generally flexible, synthetic resin material.

11. The retractable cover apparatus as set forth in claim 9, wherein the cover further includes a pair of straps, each strap being coupled with one of the edges of the cover for retaining the cover in the expanded condition.

12. A retractable vehicle cover apparatus for selectively covering a vehicle having sides, the apparatus comprising:
- an elongated housing presenting side wall structure and having an elongated aperture having a length defined through the wall structure;
- an axle disposed within the housing for rotational movement about a central axis; and
- an elongated cover having a first end and a second end coupled with the axle, the cover being selectively movable between an extended position were a substantial portion of the cover extends from the housing and a retracted position where the cover is substantially wrapped around the axle;
- the cover presenting a pair of opposed edges, and including an elastic member extending substantially between the edges of the cover, the elastic member biasing the cover toward a rest width substantially the same as the length of the aperture and an expanded width where the cover expands to cover at least a portion of the sides of the vehicle.

13. The retractable cover apparatus as set forth in claim 12, wherein the cover includes a plurality of elastic members.

14. The retractable cover apparatus as set forth in claim 12, wherein the elastic member extends substantially from the first end to the second end of the cover, the cover further including a plurality of elongated, aligned cover strips constructed from a flexible synthetic resin material.

15. The retractable cover apparatus as set forth in claim 14, wherein the cover further includes a strap coupled with each of the edges of the cover for retaining the cover in the expanded condition.

16. The retractable cover apparatus as set forth in claim 12, wherein the cover further includes a plurality of padding strips.

* * * * *